(12) United States Patent
Gu et al.

(10) Patent No.: US 10,953,505 B2
(45) Date of Patent: Mar. 23, 2021

(54) STEERING KNUCKLE CASTING HYDRAULIC FIXTURE

(71) Applicant: CITIC DICASTAL CO., LTD, Hebei (CN)

(72) Inventors: Weidong Gu, Hebei (CN); Xueqiang Li, Hebei (CN); Meiqing Feng, Hebei (CN); Longji Kang, Hebei (CN); Junshuang Liu, Hebei (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 261 days.

(21) Appl. No.: 16/247,041

(22) Filed: Jan. 14, 2019

(65) Prior Publication Data
US 2019/0321928 A1    Oct. 24, 2019

(30) Foreign Application Priority Data
Apr. 23, 2018   (CN) .......................... 201810364854.6

(51) Int. Cl.
*B23Q 3/08*    (2006.01)
*B62D 7/18*    (2006.01)

(52) U.S. Cl.
CPC .......... *B23Q 3/082* (2013.01); *B23Q 2703/04* (2013.01); *B62D 7/18* (2013.01)

(58) Field of Classification Search
CPC ... B62D 7/18; B23Q 3/18; B23Q 3/00; B23Q 3/005; B23Q 3/02; B23Q 3/06; B23Q 3/062; B23Q 3/066; B23Q 3/08; B23Q 3/082; B23Q 2703/04; B23Q 2703/10; B23Q 17/006; B23Q 17/002; B25B 11/00; B25B 11/02; B25B 27/0035; B23B 47/00; B23B 47/28; Y10T 29/53961; Y10T 29/53983; Y10T 29/54

See application file for complete search history.

(56) References Cited

U.S. PATENT DOCUMENTS

| 8,985,564 | B2 * | 3/2015 | Stanifer | B23Q 3/069 269/32 |
| 10,232,481 | B2 * | 3/2019 | Habel | B23Q 3/062 |

FOREIGN PATENT DOCUMENTS

CN          105945616 A  *  9/2016

* cited by examiner

*Primary Examiner* — Tyrone V Hall, Jr.
*Assistant Examiner* — Makena S Markman
(74) *Attorney, Agent, or Firm* — IPro, PLLC; Qian Gu

(57) ABSTRACT

A steering knuckle casting hydraulic fixture includes a positioning mandrel, a pair of flat keys fixed on a bottom surface of a fixture body, a linear bearing and an elastic taper pin match a steering knuckle casting, an angle positioning seat, a straight pin, an angle positioning nail, an angle clamping nail, a nut, a spring, a spring seat and a linear cylinder are used to restrict the rotational freedom of the casting around the Z axis, hydraulic corner cylinders, pressure plates, and support nails are used to clamp the casting, and three guide blocks are used to guide the installation of the steering knuckle casting.

1 Claim, 1 Drawing Sheet

STEERING KNUCKLE CASTING HYDRAULIC FIXTURE

CROSS REFERENCE TO RELATED APPLICATION

This application claims priority to Chinese Patent Application No. 201810364854.6 entitled STEERING KNUCKLE CASTING HYDRAULIC FIXTURE filed on Apr. 23, 2018, which is incorporated herein by reference for all purposes.

FIELD OF THE INVENTION

The present invention relates to the technical field of hydraulic fixtures, in particular to a steering knuckle casting hydraulic fixture.

BACKGROUND OF THE INVENTION

With the development of lightweight automobiles, aluminum castings with the advantages of light weight, attractive appearance, corrosion resistance and the like have been widely applied. As one of important parts of an automotive steering axle, the steering knuckle has to bear multiple impact loads of the automobile during driving to ensure stable driving and steering. The traditional steering knuckle machining often uses three-jaw chucks for manual positioning and clamping, which has the disadvantages of low precision, low efficiency, easy damage to the surface of the product, poor quality and the like and hardly achieves mass production.

SUMMARY OF THE INVENTION

An objective of the present invention is to provide a steering knuckle casting hydraulic fixture, which automatically positions, supports and clamps a casting through standard hydraulic elements and detects the fastening state of the casting by airtight detection. The steering knuckle casting hydraulic fixture includes a fixture body, a positioning mandrel, a flat key a, a flat key b, a hydraulic corner cylinder a, a pressure plate a, a support nail a, a hydraulic corner cylinder b, a pressure plate b, a support nail b, a hydraulic corner cylinder c, a pressure plate c, a support nail c, a linear bearing, an elastic taper pin, a straight pin, an angle positioning seat, an angle positioning nail, an angle clamping nail, a nut, a spring, a spring seat, a linear cylinder, a guide block a, a guide block b, a guide block c and a seal plug.

An oil inlet path, an oil outlet path and a gas path are provided inside the fixture body, and the exterior of the fixture body is provided with a bottom surface, a plane A, a plane B, a plane C and a plane D, wherein the plane A, the plane B and the plane C are parallel to each other and perpendicular to the bottom surface, and the plane D is parallel to the bottom surface. The positioning mandrel, the flat key a and the flat key b are all fixed on the bottom surface of the fixture body to connect machining equipment. The hydraulic corner cylinder a is fixed on the plane A of the fixture body, the pressure plate a is fixed on an output shaft of the hydraulic corner cylinder a, and the support nail a is fixed on the plane B of the fixture body. The hydraulic corner cylinder b is fixed on the plane A of the fixture body, the pressure plate b is fixed on an output shaft of the hydraulic corner cylinder b, and the support nail b is fixed on the plane B of the fixture body. The hydraulic corner cylinder c is fixed on the plane C of the fixture body, the pressure plate c is fixed on an output shaft of the hydraulic corner cylinder c, and the support nail c is fixed on the plane C of the fixture body.

The linear bearing is fixed on the plane B of the fixture body and connected with the elastic taper pin through a moving pair. The tapered surface of the elastic taper pin matches a steering knuckle casting to restrict the freedom of movement of the casting in the X, Y and Z directions and the freedom of rotation around the X and Y axes. The angle positioning seat is positioned by the straight pin and fixed on the plane C of the fixture body. The angle positioning nail is fixed on the angle positioning seat, and the linear cylinder is fixed on the plane D of the fixture body, is connected with the angle clamping nail through the spring seat, the spring and the nut, and cooperates with the angle positioning nail to restrict the rotational freedom of the casting around the Z axis. The guide block a, the guide block b and the guide block c are all fixed on the plane B of the fixture body to guide the installation of the steering knuckle casting. The seal plug is used to plug a process hole of the fixture body.

The present invention has the advantages of the steering knuckle casting hydraulic fixture, which automatically positions, supports and clamps a casting through standard hydraulic elements and detects the fastening state of the casting by airtight detection, can bear large cutting force during rough machining, can also guarantee accurate positioning during precision machining and can be used for batch machining of steering knuckle castings.

BRIEF DESCRIPTION OF THE DRAWINGS

The present invention will be further illustrated below in conjunction with the accompanying drawings and specific embodiments.

In which, 1—flat key a, 2—fixture body, 3—positioning mandrel, 4—flat key b, 5—hydraulic corner cylinder a, 6—pressure plate a, 7—support nail a, 8—guide block a, 9—linear bearing, 10—elastic taper pin, 11—guide block b, 12—support nail b, 13—hydraulic corner cylinder b, 14—pressure plate b, 15—guide block c, 16—straight pin, 17—angle positioning seat, 18—support nail c, 19—hydraulic corner cylinder c, 20—pressure plate c, 21—angle positioning nail, 22—angle clamping nail, 23—spring, 24—nut, 25—spring seat, 26—linear cylinder, 27—seal plug, 28—gas path, 29—oil inlet path, and 30—oil outlet path.

DETAILED DESCRIPTION OF EMBODIMENTS

Figure 1:
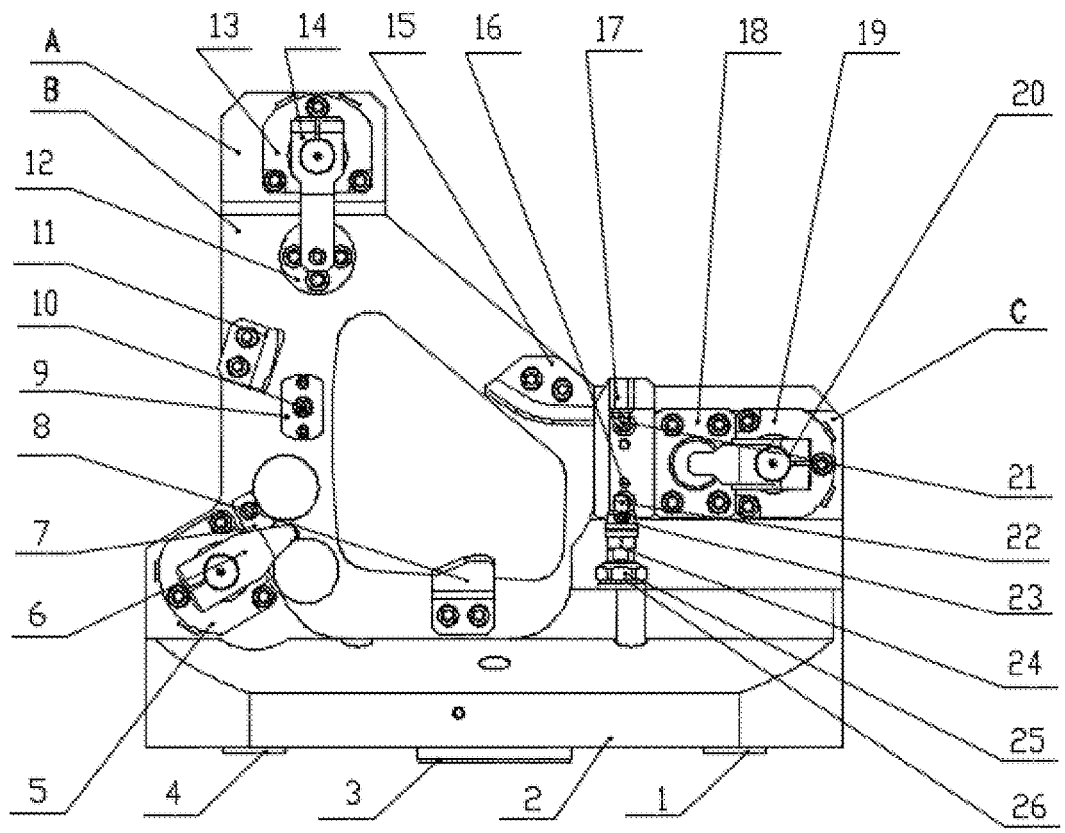
FIG. 1 is a front view of a steering knuckle casting hydraulic fixture according to the present invention.
Figure 2:
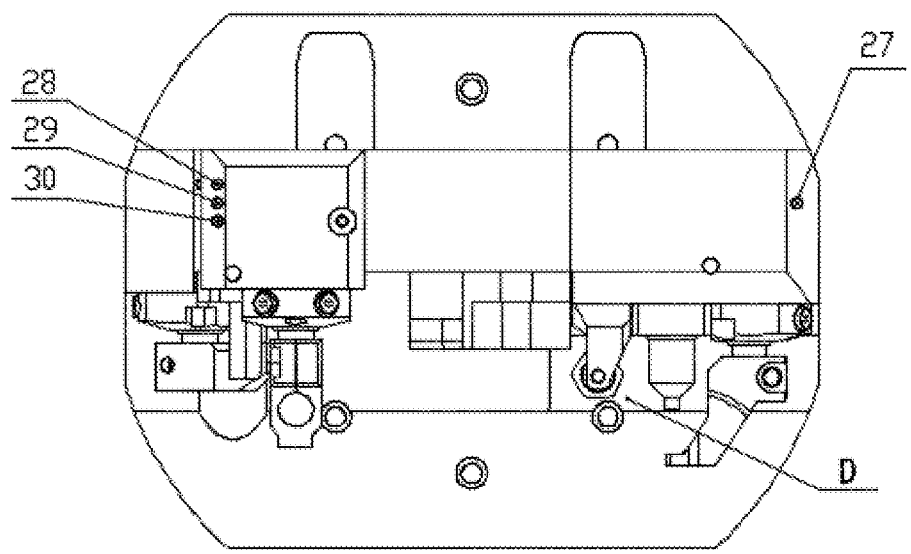
FIG. 2 is a top view of the steering knuckle casting hydraulic fixture according to the present invention.

As shown in FIGS. 1 and 2, a steering knuckle casting hydraulic fixture includes a fixture body 2, a positioning mandrel 3, a flat key a 1, a flat key b 4, a hydraulic corner cylinder a 5, a pressure plate a 6, a support nail a 7, a hydraulic corner cylinder b 13, a pressure plate b 14, a support nail b 12, a hydraulic corner cylinder c 19, a pressure plate c 20, a support nail c 18, a linear bearing 9, an elastic taper pin 10, a straight pin 16, an angle positioning seat 17, an angle positioning nail 21, an angle clamping nail 22, a nut 24, a spring 23, a spring seat 25, a linear cylinder 26, a guide block a 8, a guide block b 11, a guide block c 15 and a seal plug 27.

An oil inlet path 29, an oil outlet path 30 and a gas path 28 are provided inside the fixture body 2, and the exterior of the fixture body 2 is provided with a bottom surface, a plane A, a plane B, a plane C and a plane D, wherein the plane A, the plane B and the plane C are parallel to each other and perpendicular to the bottom surface, and the plane D is parallel to the bottom surface. The positioning mandrel 3, the flat key a 1 and the flat key b 4 are all fixed on the bottom surface of the fixture body to connect machining equipment. The hydraulic corner cylinder a 5 is fixed on the plane A of the fixture body 2, the pressure plate a 6 is fixed on an output shaft of the hydraulic corner cylinder a 5, and the support nail a 7 is fixed on the plane B of the fixture body 2. The hydraulic corner cylinder b 13 is fixed on the plane A of the fixture body 2, the pressure plate b 14 is fixed on an output shaft of the hydraulic corner cylinder b 13, and the support nail b 12 is fixed on the plane B of the fixture body 2. The hydraulic corner cylinder c 19 is fixed on the plane C of the fixture body 2, the pressure plate c 20 is fixed on an output shaft of the hydraulic corner cylinder c 19, and the support nail c 18 is fixed on the plane C of the fixture body 2.

The linear bearing 9 is fixed on the plane B of the fixture body 2 and connected with the elastic taper pin 10 through a moving pair. The tapered surface of the elastic taper pin 10 matches a steering knuckle casting to restrict the freedom of movement of the casting in the X, Y and Z directions and the freedom of rotation around the X and Y axes. The angle positioning seat 17 is positioned by the straight pin 16 and fixed on the plane C of the fixture body 2. The angle positioning nail 21 is fixed on the angle positioning seat 17, and the linear cylinder 26 is fixed on the plane D of the fixture body 2, is connected with the angle clamping nail 22 through the spring seat 25, the spring 23 and the nut 24, and cooperates with the angle positioning nail 21 to restrict the rotational freedom of the casting around the Z axis. The guide block a 8, the guide block b 11 and the guide block c 15 are all fixed on the plane B of the fixture body 2 to guide the installation of the steering knuckle casting. The seal plug 27 is used to plug a process hole of the fixture body 2.

The invention claimed is:
1. A steering knuckle casting hydraulic fixture, comprising: a fixture body, a positioning mandrel, a first flat key, a second flat key, a first hydraulic corner cylinder, a first pressure plate, a first support nail, a second hydraulic corner cylinder, a second pressure plate, a second support nail, a third hydraulic corner cylinder, a third pressure plate, a third support nail, a linear bearing, an elastic taper pin, an angle positioning seat, a straight pin, an angle positioning nail, an angle clamping nail, a nut, a spring, a spring seat, a linear cylinder, a first guide block, a second guide block, a third guide block and a seal plug;
  wherein an oil inlet path, an oil outlet path and a gas path are provided inside the fixture body, and an exterior of the fixture body is provided with a bottom surface, a first plane, a second plane, a third plane and a fourth plane, wherein the first plane, the second plane and the third plane are parallel to each other and perpendicular to the bottom surface, and the fourth plane is parallel to the bottom surface, the positioning mandrel, the first flat key and the second flat key are all fixed on the bottom surface of the fixture body to connect a machining equipment, the first hydraulic corner cylinder is fixed on the first plane of the fixture body, the first pressure plate is fixed on an output shaft of the first hydraulic corner cylinder, and the first support nail is fixed on the second plane of the fixture body; the second hydraulic corner cylinder is fixed on the first plane of the fixture body, the second pressure plate is fixed on an output shaft of the second hydraulic corner cylinder, and the second support nail is fixed on the second plane of the fixture body; the third hydraulic corner cylinder is fixed on the third plane of the fixture body, the third pressure plate is fixed on an output shaft of the third hydraulic corner cylinder, and the third support nail is fixed on the third plane of the fixture body; and
  wherein the linear bearing is fixed on the second plane of the fixture body and connected with the elastic taper pin through moving pairs, a tapered surface of the elastic taper pin matches a steering knuckle casting to restrict a freedom of movement of the casting in X, Y and Z directions and a freedom of rotation around X and Y axes, the angle positioning seat is positioned by the straight pin and fixed on the third plane of the fixture body, the angle positioning nail is fixed on the angle positioning seat, the linear cylinder is fixed on the fourth plane of the fixture body, is connected with the angle clamping nail through the spring seat, the spring and the nut and cooperates with the angle positioning nail to restrict a rotational freedom of the casting around a Z axis, the first guide block, the second guide block and the third guide block are all fixed on the second plane of the fixture body to guide an installation of the steering knuckle casting, and the seal plug plugs a process hole of the fixture body.

\* \* \* \* \*